United States Patent Office.

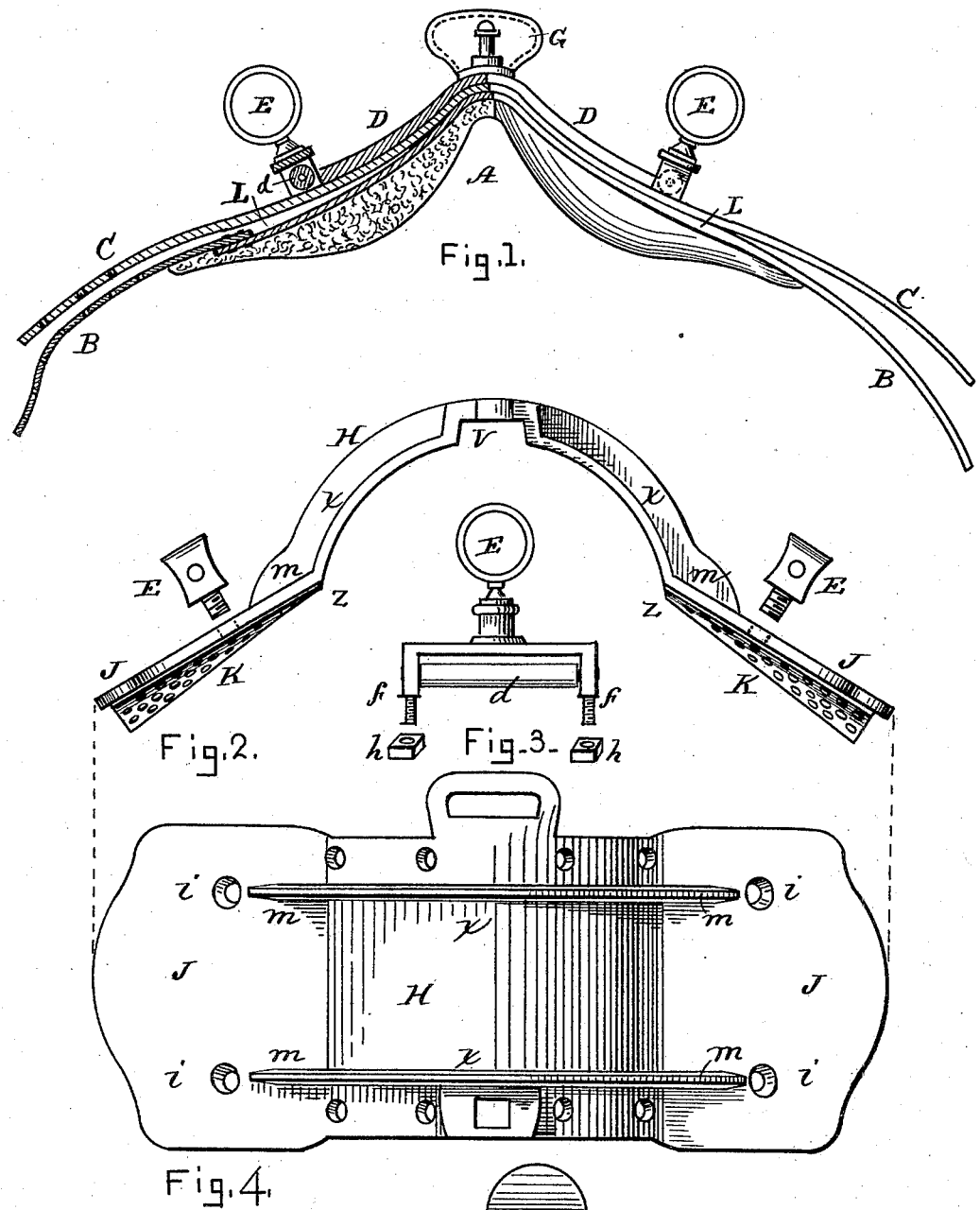

GEORGE THEOBALD, OF BOSTON, MASSACHUSETTS, ASSIGNOR TO HIMSELF AND THOMAS HURL, OF SAME PLACE, AND THOMAS HAVENS, OF CHELSEA, MASSACHUSETTS.

HARNESS-SADDLE.

SPECIFICATION forming part of Letters Patent No. 302,603, dated July 29, 1884.

Application filed March 13, 1884. (No model.)

*To all whom it may concern:*

Be it known that I, GEORGE THEOBALD, of Boston, in the county of Suffolk, State of Massachusetts, have invented a certain new and useful Improvement in Saddles, of which the following is a description sufficiently full, clear, and exact to enable any person skilled in the art or science to which said invention appertains to make and use the same, reference being had to the accompanying drawings, forming a part of this specification, in which—

Figure 1 is a side elevation of my improved saddle, a part of the same being shown in vertical longitudinal section; Fig. 2, a side elevation of the tree detached; Fig. 3, a view of the terret detached; Fig. 4, a top plan view of the tree shown in Fig. 2, and Fig. 5 a perspective view of the ordinary tree.

Like letters of reference indicate corresponding parts in the different figures of the drawings.

My invention relates more especially to harness-saddles; and it consists in a novel construction and arrangement of the parts, as hereinafter more fully set forth and claimed, by which a more desirable article of this character is produced than is now in ordinary use.

The nature and operation of the improvement will be readily understood by all conversant with such matters from the following explanation.

In the drawings, A represents the pads, B the skirts, C the back, D the jockey, E the driving-rein terrets, L the cover, and G the water-hook or check-rein terret, all of these parts, except the terrets E, being of the ordinary construction. The form of the tree is best seen in Figs. 2 and 4, the body H being arched or forming the arc of a circle, and the wings or pad-supports J inclined thereto at an angle of about forty-five degrees. The body and wings are preferably cast integral, and provided with V-shaped ribs or upwardly-projecting truss-flanges $x$, which extend entirely across the body, and project outwardly onto the wings, as best seen in Fig. 4. These flanges are arranged in parallelism, and serve not only to strengthen the tree, but also act as guards to keep the back-band in proper position on the saddle. They are enlarged in vertical cross-section at $m$, to give the tree additional strength at the junction of the wings and body, and also to prevent the back-band from riding over them at that point or near the terrets E. They also serve to fill the depression between the wings and body, and sustain the cover of the saddle at that section. A foraminous disk, K, is secured to the under side of either wing, as shown in Fig. 2. These disks are shaped somewhat like the bowl of a spoon, and are open at their inner or larger ends, $z$, their other edges being detachably fastened by screws or in any other suitable manner to the wings. The terrets E are formed as best seen in Fig. 3, being provided with horizontally-arranged rollers $d$, journaled in the vertical standards $f$, which are threaded at their lower ends to receive corresponding nuts, $h$, and pass through holes $i$ in the wings J, the terrets being secured to the tree by turning the nuts onto the standards beneath the tree. The back-band C is whole, passing entirely over the saddle beneath the rollers $d$, and resting between the flanges $x$, the rollers permitting the band to move freely back and forth longitudinally, and the flanges keeping it in position laterally. The body H of the tree is provided with a cavity or depression, $v$, on its under side at the front edge, to receive a nut for attaching the terret G. In saddles of this description as sometimes constructed the tree is nearly V-shaped, as shown in Fig. 5, and when so formed and the pads are applied it is liable to gall and injure the back of the horse. The perspiration is also absorbed by the pad, and as no means of ventilation is provided they remain wet longer than is desirable, thereby causing them to rot or wear out rapidly. To obviate the first of these objections I form the tree with the arch H, which relieves all pressure on the back of the horse at the center of the saddle, prevents galling, and also greatly strengthens the saddle; and to obviate the second objection I make use of the perforated disks K, which thoroughly ventilate the pads beneath the wings J, and render less filling or stuffing necessary than is required in saddles of this description as usually made. The rollers $d$ in the terrets E tend to keep the back-band in proper position between the flanges $x$, and also permit it to render or move freely longitudinally of the saddle without binding as it passes under the terrets. The flanges $m$ and tree between the same may be covered with a proper lining, or the back-band may rest directly on the body H, as preferred.

Having thus explained my invention, what I claim is—

1. A saddle-tree having the arched body H, wings J, and flanges $x$, constructed and arranged substantially as specified.

2. In a saddle-tree substantially such as described, the foraminous disks K, in combination with the wings J, substantially as and for the purpose set forth.

3. In a harness-saddle substantially such as described, the terret E, having the standards $f$, and provided with the roller $d$ and nuts $h$, substantially as set forth.

4. In a harness-saddle substantially such as described, the back-band C, passing entirely over the saddle between the flanges $x$, in combination with the terrets E, having the rollers $d$, substantially as set forth.

5. The improved saddle herein described, the same consisting of a tree having the curved body H, wings J, disks K, and flanges $x$, the terrets E, having the rollers $d$, the pads A, skirts B, back-band C, cover L, jockey D, and terret G, constructed, combined, and arranged to operate substantially as specified.

GEORGE THEOBALD.

Witnesses:
C. A. SHAW,
L. J. WHITE.